United States Patent Office 3,451,936
Patented June 24, 1969

3,451,936
SURFACTANT COMPOSITIONS FROM ACTIVE HYDROGEN ORGANIC COMPOUNDS, FATTY ACID ESTERS AND ALKYLENE OXIDES, AND RELATED MANUFACTURING PROCESS
Luciano Nobile, Emanuele Condorelli, Tullio La Noce, and Anteo Poma, Milan, Italy, assignors to Ledoga S.p.A., Milan, Italy
No Drawing. Filed June 14, 1965, Ser. No. 463,894
Claims priority, application Italy, Apr. 24, 1965, 9,056/65
Int. Cl. C11d 1/44
U.S. Cl. 252—152
4 Claims

ABSTRACT OF THE DISCLOSURE

A 100% surfactant composition is prepared by simultaneously reacting at temperatures from 70° to 200° C., at pressures generally lower than 5 atm., in the presence of an alkaline catalyst, for a maximum time of 150 minutes, an active hydrogen compound, a fatty acid ester (preferably a natural or synthetic triglyceride) and an alkylene oxide in the ratio respectively of 10–50:50–90: 100–300 parts by weight.

---

The present invention relates to new surfactant compositions obtained by simultaneously reacting one or more active hydrogen organic compounds chosen from the classes later stated, one or more fatty acid esters having from 6 to 30 carbon atoms, and one or more alkylene oxides having from 2 to 4 carbon atoms.

The present invention also relates to the manufacturing process of these compositions.

It is known that surfactants have been prepared from some active hydrogen compounds by reaction with ethylene or propylene oxide.

We have found that by making to react simultaneously one or more active hydrogen compounds—chosen from an extremely wide range of substances—even not previously used by the known technique, for the purpose of obtaining surfactants—together with one or more alkylene oxide with 2 to 4 carbon atoms and fatty acid esters—particularly natural or synthetic triglycerides—it is possible to obtain, in a reproducible manner, new compositions, eventually comprising new chemical species, which have surfactant properties similar to or better than the known surfactant obtained by reaction of some active hydrogen compounds with alkylene oxides.

The properties of the compositions envisaged in the invention embrace an extremely wide field which ranges from humidifiers, wetting agents and imbibents, to detergents, etc. Moreover, some of these compositions also show marked antiseptic properties.

Preferably in preparing these new compositions, the fatty acid esters—especially natural and/or synthetic triglycerides—are used in even very high percentages, for example 90% of the total formed by said esters and the active hydrogen compound(s). Consequently, since natural and/or synthetic triglycerides are generally low costing substances, and the active hydrogen organic compounds can be chosen from an extremely wide field on the basis of economic criteria as well as of the properties desired for the resulting composition, it is clear that the cost of the present composition may be very economical where the manufacturing process is also such, taken as a whole.

It must be pointed out that the quantity of unaltered triglyceride remaining in the surfactant composition of the present invention, may be regulated as convenient and also may be made to practically disappear, by suitably varying the proportions of the reagents in particular.

Now the said process, perfectly reproducible, is carried out in a single phase at moderate temperature and pressure conditions, preferably in the absence of solvents, with very economical catalysts such as alkaline hydroxides, with short reaction times, obtaining even practically quantitative yields of substantially surfactant products, or acting as such in the obtained compositions, as can be deduced from comparing the surface tension values of the present compositions and those of known surfactants. Moreover, the present compositions may be immediately utilized as such, as discharged from the reactor—or in case after neutralization—that is, without requiring any separation or purification treatment.

In view of the above, and observing that:

there is no need for the reagents to be particularly pure;
the reactions are exothermic on the whole and thus, once started up, no heating is required in the majority of cases;
the process may be carried out continuously;

it follows that even the process and thus the compositions themselves may be extraordinarily economical.

We shall now describe in detail how the invention is carried out.

As already stated, the starting raw materials consist of active hydrogen organic compounds, fatty acid esters and alkylene oxides.

The active hydrogen organic substances here considered are the following:

(a) Primary and/or secondary aliphatic and aromatic amines and their derivatives with one or more amine groups, such as:

laurylamine, myristylamine, oleylamine, etc.
N-alkylaurylamine, N-alkyloleylamine, etc.
ethylenediamine, diethylenetriamine, triethylenetetramine, etc.
aniline, o-, m-, p-phenylenediamine, etc.
amine-amides of type: $R.CO.NH.C_6H_4.NH_2$, etc.

(b) Aromatic and aliphatic amides and sulphonamides and their derivatives with one or more amide groups, such as:

laurylamide, myristylamide, oleylamide, palmitylamide, etc.
lauric acid monoethanolamide, oleic acid monoethanolamide, etc.

benzoic acid amide, abietic acid amide, etc.
abietic acid monoethanolamide, etc.
nicotinic acid amide, isonicotinic acid amide
alkyl-, aryl-, alkylaryl-sulphonamides.

(c) Aliphatic and aromatic amino-alcohols and their derivatives possessing one or more amine and alcoholic groups, such as:

mono-, di-ethanolamine, mono-, di-isopropanolamine, di-glycerylamine, 2 - amino-2-methyl-1,3-propanediol, trihydroxyethyl-amino-methane, etc.
2-aminophenol, etc.

(d) Aliphatic and aromatic carboxylic acids and their derivatives with one or more carboxylic groups, such as:

lauric acid, myristic acid, oleic acid, stearic acid, etc.
tall-oil as such (that is, with the fundamental components: fatty acids, resinic acids, etc.)
fatty acids from tall-oil, fatty acids from tall-oil with different resinic acid content, etc.
fatty acids from oxidized paraffin waxes, etc.
benzoic acid, terephthalic acid, naphthenic acids, etc.

(e) Aliphatic and aromatic mercaptans with one or more thiol groups such as:

compounds of R—SH type, where R is a linear alkyl chain having from 10 to 18 carbon atoms, or R is a branched alkyl chain (products deriving from petrol chemistry for reaction of olefines with $H_2S$ in the presence of catalysts)
thiophenol, etc.
2-mercapto-benzothiazole, etc.

(f) Phenols and alkylphenols possessing one or more hydroxyl groups such as:

phenol
mono-alkylated, dialkylated or poly-alkylated phenols, in which the alkyl chains are linear and comprise from 5 to 10 carbon atoms
branched-chain alkylphenols: di-amylphenol, p-tert.-octylphenol (from di-isobutene) and nonyl-phenol (from tripropene)
cresols, etc.
2,2-bis-(p-hydroxyphenyl)propane, etc.

(g) Amino acids and their derivatives with one or more amino and carboxyl groups, such as:

glycine, alanine, 2-amino-butyric acid, valine, isoleucine, etc.
hydrolystates of protein substances, etc.

The fatty acid esters here considered are those in which the saturated or unsaturated fatty acids contain from 6 to 30 carbon atoms and the alcohols are aliphatic mono- or poly-hydric with 1 to 18 carbon atoms; for instance, natural and/or synthetic fats and oils, such as mono-, di- and tristerin, mono-, di- and tripalmitin, etc., methyl stearate and palmitate, etc.

The alkylene oxides here considered are the lower ones containing from 2 to 4 carbon atoms, for instance, ethylene, propylene oxides, etc., but especially the first.

The catalysts here considered are those of alkaline type such as hydroxides, carbonates, alcoholates, salts of organic acids with alkaline metals, tertiary amines as free bases or as salts with aliphatic carboxylic acids, and others, but preferably alkaline metal hydroxides.

The process for preparing the mixtures covered by the present invention is carried out by making simultaneously react members chosen from all the three classes mentioned, in the presence of a catalyst chosen from those mentioned, preferably in the absence of solvents, at temperatures ranging from 80° C. to 200° C. and pressures less than 50 atm., and advantageously at only a few atmospheres.

We shall now describe the preferred operative method for a discontinuous application of the invention, although pointing out that the processes can be carried out continuously on making the suitable changes within the scope of the man skilled in the art.

The fatty acid ester, the active hydrogen organic compound and the catalyst are introduced into a reactor, heating to 80–110° C., with stirring. Temperature must be maintained around the lower limit of the above temperature interval, when thermolabile substances are present.

The air is removed from the reaction space, if this has not been done previously, by flushing with an inert gas. The latter is then displaced by the alkylene oxide, the temperature is brought to that for triggering the reactions, generally speaking ranging from 90° C. to 115° C., and as soon as the reaction begins the alkylene oxide is fed continuously and its rate is so regulated as to bring the pressure in the reactor to around 2–4 atm. At the same time the reactor temperature is checked in order to maintain the reacting mass to those temperatures below 200° C. which are most suitable for the particular reaction and to avoid possible alterations of thermolabile reagents.

When all the alkylene oxide has been introduced, the pressure is allowed to fall to approximately atmospheric pressure; the reactor is cooled to a suitable temperature, stirring and flushing with inert gas, and the product is discharged. The process yield is practically quantitative.

As long as the above-mentioned reaction temperature conditions are respected, it is also possible to carry out the process differently providing the substances are allowed to react simultaneously and with the indicated catalysts. Thus, for instance, the reaction may be realized in more than one step and/or at pressures even much higher than 2–3 atm. and also operated in the presence of solvents. In some cases, e.g. when using very reactive starting substances, heating should be applied to reactor only when reagents of all the three classes are present in the reaction space. However and in general the preferred mode of operation, above detailed, is the most economical and gives the best surfactant compositions.

The characteristics of the compositions obtained with the process according to the present invention vary according to the nature of the reagents and to the quantitative proportions in which they are introduced, as well as to the reaction conditions.

These extremely versatile compositions generally possess excellent dispersing, wetting, emulsifying and/or detergent properties, etc.

Moreover, on using ethylene oxide the resulting compositions are generally soluble in water and in many organic solvents such as acetone, methanol, ethanol, chloroform, carbon tetrachloride, dimethylformamide, benzol, etc., and varyingly soluble in aliphatic and cycloaliphatic hydrocarbons.

In particular, the compositions of this invention having detergent properties are generally compatible with the usual additives for detergents. Examples of these additives are: phosphates, silicates, borates, carbonates, sulphates, alkaline chlorides and sodium carboxymethylcellulose.

Moreover, many different types of known surfactants, whether biodegradable or not, are compatible in mixture with surfactants produced according to the invention.

Here following are the surfactant data relative to the example compositions obtained according to the present invention.

TABLE.—SURFACE TENSION (DYNES/CM.) OF AQUEOUS SOLUTIONS OF NEW SURFACTANTS DETERMINED AT 20° C.

| Corresp. example: | Substances allowed to react | Parts by weight | Units | g. of surfactant/100 ml. of water | | | |
|---|---|---|---|---|---|---|---|
| | | | | 0.001 | 0.01 | 0.1 | 1 |
| 1 | Oleylamine / Tallow / Ethylene oxide | 40 / 60 / 200 | Dynes/cm | 47.52 | 39.89 | 37.62 | 38.65 |
| 2 | Ethylenediamine / Tallow / Ethylene oxide | 12 / 84 / 200 | ....do.... | 50.36 | 37.35 | 37.42 | 40.01 |
| 3 | Oleylamine / Tallow / Ethylene oxide | 40 / 60 / 200 | ....do.... | 48.21 | 39.99 | 35.10 | 36.46 |
| 4 | p-Toluenesulphonamide / Tallow / Ethylene oxide | 29 / 71 / 200 | ....do.... | 49.7 | 40.0 | 37.9 | 38.5 |
| 6 | Diethanolamine / Tallow / Ethylene oxide | 21 / 84 / 162 | ....do.... | 46.12 | 38.29 | 36.68 | 38.68 |
| 7 | Tall oil / Tallow / Ethylene oxide | 30 / 70 / 200 | ....do.... | 50.7 | 39.3 | 38.8 | 40.0 |
| 9 | N-dodecyl-mercaptan / Tallow / Ethylene oxide | 33 / 67 / 200 | ....do.... | 51.5 | 40.75 | 36.7 | 03.6 |
| 10 | Phenol / Tallow / Ethylene oxide | 25 / 75 / 200 | ....do.... | 55 | 41.3 | 38.5 | 38.0 |
| 11 | Beta-alanine / Tallow / Ethylene oxide | 24 / 76 / 200 | ....do.... | 58.8 | 38.9 | 34 | 33.5 |

The data reported in the table show that the compositions of the invention have excellent surfactant properties.

The preparation of the compositions of the present invention is illustrated by the following examples in which substances belonging to all the above-mentioned groups of the class of active hydrogen compounds are used in turn.

Example I.—(group a)

60 parts by weight of tallow, 40 parts by weight of oleylamine (9-octadecenylamine) and 3 parts by weight of 50% potassium hydroxide solution, as catalyst, are placed in an oxyethylenation autoclave.

The mixture is heated to 110–120° C., and after the preliminary air removal and nitrogen flushing operation, the ethylene oxide is allowed to flow, adjusting the temperature.

The amount of ethylene oxide added in this operation is 200 parts by weight.

The reaction conditions and the time are given hereunder.

| Time (in minutes) | 0 | 15 | 25 | 35 | 45 | 55 | 65 | 75 |
|---|---|---|---|---|---|---|---|---|
| Temperature (in ° C.) | 100 | 120 | 129 | 130 | 132 | 145 | 148 | 145 |
| Pressure atm. gauge | 0 | 2 | 3 | 3 | 4 | 4 | 4 | 0 |

At the end, a light fluid oil is discharged at 50° C., and on cooling turns into a semisolid wax dispersible in water and soluble in many organic solvents.

Example II.—(group a)

84 parts by weight of tallow, 12 parts by weight of anhydrous ethylenediamine, and 2.8 parts by weight of 50% aqueous potassium hydroxide solution as catalyst are placed in an autoclave.

The mixture is allowed to react with 192 parts by weight of ethylene oxide, operating as described in Example I.

The temperature and pressure variations recorded during the reaction are given hereunder:

| Time (in minutes) | 0 | 10 | 20 | 30 | 40 | 60 | 70 | 80 |
|---|---|---|---|---|---|---|---|---|
| Temperature (in ° C.) | 120 | 135 | 130 | 129 | 125 | 137 | 131 | 133 |
| Pressure atm. gauge | 0 | 1.4 | 2.25 | 2.2 | 1.65 | 1.8 | 1.70 | 0 |

At the end, a thick yellow to brown oil (285 parts by weight) is discharged at 50–60° C.

The filtered clear oil becomes a ductile pasty mass on cooling, soluble in water, giving a milky solution, and in many organic solvents.

Example III.—(group b)

60 parts by weight of tallow, 40 parts by weight of oleylamide (9-octadecenoic acid amide) and 3 parts by weight of 50% aqueous potassium hydroxide solution, as catalyst, are placed in an autoclave.

Operating as described in Example I, 200 parts by weight of ethylene oxide are gradually added.

The following temperature and pressure variations have been recorded during the reaction:

| Time (minutes) | 0 | 10 | 20 | 40 | 50 | 60 | 70 | 75 | 85 | 90 |
|---|---|---|---|---|---|---|---|---|---|---|
| Temperature (° C.) | 110 | 120 | 125 | 128 | 126 | 125 | 132 | 140 | 145 | 150 |
| Pressure atm. gauge | 0 | 1.4 | 1.6 | 1.6 | 1.7 | 2.1 | 2.6 | 2.6 | 3 | 0 |

A yellow to light brown fluid oil is discharged at 50° C. At room temperature (20° C.) the oil becomes thicker, dissolves well in water, giving clear solutions, and the solubility in organic solvents is also good.

Example IV.—(group b)

71 parts by weight of tallow and 29 parts by weight of para-toluene-sulphonamide, together with 3 parts by weight of aqueous 50% potassium hydroxide as catalyst, are loaded into an autoclave.

After performing the preliminary operations of removing the air and flushing with nitrogen, the mixture heated to 120–125° C. is allowed to react with 200 parts by weight of ethylene oxide, introduced gradually. The temperature and pressure variations recorded during the reaction are as follows:

| Time (minutes) | 0 | 5 | 15 | 35 | 45 | 47 | 55 | 60 | 70 |
|---|---|---|---|---|---|---|---|---|---|
| Temperature (° C.) | 125 | 140 | 145 | 145 | 150 | 155 | 135 | 140 | 125 |
| Pressure atm. gauge | 0 | 2 | 2.6 | 3.8 | 3.2 | 4.0 | 4.2 | 3.8 | 0 |

A light amber oil is discharged at the end, which can be still further bleached with hydrogen peroxide (0.5% of a 30% solution).

The product is perfectly soluble in water and in the majority of organic solvents. It is only slightly soluble in hexane and petrol ether.

Example V.—(group c)

Following the same technique described in Example I, 90 parts by weight of tallow and 10 parts by weight of mono-ethanolamine are made to react with 200 parts by weight of ethylene oxide, added gradually, in the presence of 3 parts by weight of 50% potassium hydroxide solution.

The addition is completed in approximately 90 minutes, adjusting the temperature so as not to exceed 150° C.

At the end, a thick yellow oil is discharged at 50° C. and on cooling it becomes viscous. The product dissolves in water, giving a milky solution, and is also soluble in ordinary organic solvents.

Example VI.—(group c)

84 parts by weight of tallow and 21 parts by weight of anhydrous diethanolamine, together with 3 parts by weight of 50% potassium hydroxide solution as catalyst, are placed in an autoclave.

The mixture is allowed to react, as described in Example I, with 162 parts by weight of ethylene oxide, introduced gradually.

The temperature and pressure variations registered during the reaction are given in the following table:

| Time (in minutes) | 0 | 5 | 15 | 45 | 55 | 65 | 75 | 90 |
|---|---|---|---|---|---|---|---|---|
| Temperature (in ° C.) | 110 | 115 | 120 | 130 | 141 | 136 | 131 | 120 |
| Pressure atm. gauge | 0 | 1.3 | 1.35 | 2.0 | 2.25 | 1.60 | 0.50 | 0 |

A transparent pale yellow fluid oil is discharged at the end. Refractive index $n_D^{20} = 1.3659$.

The product so obtained, substantially free from unaltered starting triglyceride, is soluble in water and in many organic solvents.

Example VII.—(group d)

70 parts by weight of tallow, 30 parts by weight of tall oil (containing 25% by weight of resinic acids) and 3 parts by weight of 50% potassium hydroxide solution, as catalyst, are placed in an autoclave.

After flushing out the air with an inert gas, 200 parts by weight of ethylene oxide are gradually added to the mixture, adjusting the temperature.

The temperature and pressure variations registered during the reaction are given in the following table:

| Time (minutes) | 0 | 15 | 30 | 45 | 60 | 75 | 80 | 90 | 100 | 110 |
|---|---|---|---|---|---|---|---|---|---|---|
| Temperature (° C.) | 110 | 130 | 150 | 155 | 160 | 168 | 177 | 160 | 175 | 155 |
| Pressure atm. gauge | 0 | 1.9 | 1.9 | 2.8 | 2.8 | 3.9 | 4.2 | 4.2 | 4.1 | 0 |

At the end, a clear light oil is discharged at 50° C. which on cooling turns into a semisolid mass. The product is substantially free from the starting triglyceride and is soluble in water and in many organic solvents.

Example VIII.—(group d)

50 parts by weight of tallow and 50 parts by weight of oleic acid are loaded into an autoclave together with 3 parts by weight of 50% potassium hydroxide solution, as catalyst.

After carrying out the preliminary operations of removal of the air and flushing with nitrogen, the above mixture, heated up to 130° C., is allowed to react with 200 parts by weight of ethylene oxide, added gradually.

The temperature of 180° C. is never exceeded.

At the end, a thick amber oil is discharged at 50° C.: it is dispersible in water and soluble in the majority of organic solvents.

Example IX.—(group e)

67 parts by weight of tallow, 33 parts by weight of n-dodecyl-mercaptan and 3 parts by weight of 50% potassium hydroxide solution are placed in an autoclave.

The air is evacuated and the autoclave flushed with nitrogen, then gradually allowing 200 parts by weight of ethylene oxide to flow in.

The following temperature and pressure changes were recorded during the absorption of the ethylene oxide:

| Time (minutes) | 0 | 5 | 25 | 55 | 85 | 105 | 120 | 135 |
|---|---|---|---|---|---|---|---|---|
| Temperature (° C.) | 116 | 125 | 133 | 135 | 149 | 139 | 136 | 125 |
| Pressure atm. gauge | 0 | 1.75 | 1.8 | 1.5 | 1.9 | 2.0 | 1.10 | 0 |

At the end, a fluid, clear amber color oil is discharged at 50–60° C. The oil forms a yellow paste at room temperature, dispersible in water and soluble in many organic solvents.

Example X.—(group f)

75 parts by weight of tallow, 25 parts by weight of phenol and 3 parts by weight of 50% potassium hydroxide solution, as catalyst, are placed in an oxyethylenation autoclave.

Operating as in Example I, 200 parts by weight of ethylene oxide are gradually added. During the reaction, cooling is adjusted so as not to exceed a temperature of 175° C.

Absorption occurs rapidly and the reaction is completed in 50 minutes.

A clear light amber oil is discharged at the end.

The product is substantially free from the starting triglyceride and is perfectly soluble in water and is perfectly soluble in water and in many organic solvents.

Example XI.—(group g)

76 parts by weight of tallow, 24 parts by weight of beta-alanine and 3 parts by weight of 50% potassium hydroxide solution, as catalyst, are placed in an autoclave.

Operating as in Example I, 200 parts by weight of ethylene oxide are gradually added. The temperature and pressure variations recorded during the reaction were as follows:

| Time (minutes) | 0 | 10 | 30 | 55 | 80 | 90 | 95 | 100 |
|---|---|---|---|---|---|---|---|---|
| Temperature (° C.) | 100 | 128 | 145 | 148 | 160 | 140 | 150 | 145 |
| Pressure atm. gauge | 0 | 2.4 | 2.2 | 4.0 | 3.8 | 4.4 | 4.4 | 0 |

A clear, fluid light red oil is discharged at the end. The product disperses in water and is soluble in many organic solvents.

Variations can of course be made without departing from the spirit of the invention.

Having thus described our invention, what we desire to secure and claim by Letters Patent is:

1. Surfactant compositions obtained by simultaneously reacting at temperatures from 70° to 200° C. at pressures below 50 atm. and in the presence of an alkaline catalyst (1) at least one active hydrogen compound selected from the group consisting of laurylamine, myristylamine, olelylamine, N-alkylaurylamine, N-alkyloleylamine, ethylenediamine, diethylenetriamine, triethylenetetramine, aniline, a phenylenediamine, laurylamide, myristylamide, oleylamide, palmitylamide, lauric acid monoethanolamide, oleic acid monoethanolamide, benzoic acid amide, abietic acid amide, abietic acid monoethanolamide, nicotinic acid amide, isonicotinic acid amide, p-toluenesulphonamide, aliphatic and aromatic amino-alcohols containing at least one amino group and at least one hydroxyl group, aliphatic and aromatic carboxylic acids having from 6 to 30 carbon atoms, aliphatic and aromatic mercaptans of the formula R—SH wherein R contains from 10 to 18 carbon atoms, phenol, alkylphenols having at least one hydroxyl group, 2,2-bis-(p-hydroxyphenyl)propane, glycine, alanine, 2-amino-butyric acid, valine and isoleucine, (2) at least one triglyceride and (3) an alkylene oxide with 2 to 4 carbon atoms, in the ratio respectively of 10–50 parts to 50–90 parts to 100–300 parts by weight.

2. Process for the preparation of surfactant compositions by simultaneously reacting at temperatures from 70° to 200° C. at pressures under 50 atm. and in the presence of an alkaline catalyst (1) at least one active hydrogen compound selected from the group consisting of laurylamine, myristylamine, olelylamine, N-alkylaurylamine, N-alkyloleylamine, ethylenediamine, diethylenetriamine, triethylenetetramine, aniline, a phenylenediamine, laurylamide, myristylamide, oleylamide, palmitylamide, lauric acid monoethanolamide, oleic acid monoethanolamide, benzoic acid amide, abietic acid amide, abietic acid monoethanolamide, nicotinic acid amide, isonicotinic acid amide, p-toluenesulphonamide, aliphatic and aromatic amino-alcohols containing at least one amino group and at least one hydroxyl group, aliphatic and aromatic carboxylic acids having from 6 to 30 carbon atoms, aliphatic and aromatic mercaptans of the formula R-SH wherein R contains from 10 to 18 carbon atoms, phenol, alkylphenols having at least one hydroxyl group, 2,2-bis(p-hydroxyphenyl)propane, glycine, alanine, 2-amino-butyric acid, valine and isoleucine, (2) at least one triglyceride and (3) an alkylene oxide with 2 to 4 carbon atoms, in the ratio respectively of 10–50 parts to 50–90 parts to 100–300 parts by weight.

3. Surfactant compositions according to claim 1 wherein the triglyceride is tallow and the alkylene oxide is ethylene oxide.

4. Surfactant compositions according to claim 3 wherein the active hydrogen compound is selected from the group consisting of oleylamine, ethylenediamine, p. toluenesulphonamide, diethanolamine, tall oil, N-dodecyl-mercaptan, phenol and beta-alanine.

References Cited

UNITED STATES PATENTS

| | | | |
|---|---|---|---|
| 2,597,204 | 5/1952 | Todd et al. | 260—97.5 |
| 2,677,700 | 5/1954 | Jackson et al. | 260—97.5 |
| 3,124,602 | 3/1964 | Altscher et al. | 252—354 |
| 3,243,382 | 3/1966 | Johnson | 252—353 |

OTHER REFERENCES

Noller, C. R., "Chemistry of Organic Compounds," W. B. Saunders, Philadelphia, 1957 OD 253 N 65 1957 C. 3 (p. 181 relied on).

Schwartz et al., "Surface Active Agents," Interscience Publishers, N.Y. 1949 Tp 149 S3 C. 10 (p. 207 relied on).

DONALD E. CZAJA, Primary Examiner.

WILLIAM E. PARKER, Assistant Examiner.

U.S. Cl. X.R.

252—89, 110, 117, 131; 260—18, 21, 97.5, 398